United States Patent
Agrawal et al.

(10) Patent No.: US 11,721,077 B2
(45) Date of Patent: Aug. 8, 2023

(54) ELECTRONIC DEVICE THAT PRESENTS LOCATION-TETHERED AUGMENTED REALITY NOTIFICATIONS

(71) Applicant: MOTOROLA MOBILITY LLC, Wilmington, DE (US)

(72) Inventors: Amit Kumar Agrawal, Bangalore (IN); Alexandre Neves Creto, Sao Paulo (BR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/544,073

(22) Filed: Dec. 7, 2021

(65) Prior Publication Data

US 2023/0177774 A1 Jun. 8, 2023

(51) Int. Cl.
*G06T 19/00* (2011.01)
*G06F 3/14* (2006.01)
*G06V 20/10* (2022.01)
*G06F 3/01* (2006.01)

(52) U.S. Cl.
CPC ............ *G06T 19/006* (2013.01); *G06F 3/012* (2013.01); *G06F 3/14* (2013.01); *G06V 20/10* (2022.01)

(58) Field of Classification Search
CPC ......... G06T 19/006; G06F 3/012; G06F 3/14; G06V 20/10
See application file for complete search history.

(56) References Cited

U.S. PATENT DOCUMENTS

| | | | | |
|---|---|---|---|---|
| 2017/0134553 | A1* | 5/2017 | Jeon | H04W 4/08 |
| 2018/0150996 | A1* | 5/2018 | Gatta | G06F 3/012 |
| 2019/0041973 | A1* | 2/2019 | Maheshwari | H04L 12/2803 |
| 2019/0353904 | A1* | 11/2019 | Ardovino | G06F 3/013 |
| 2022/0028122 | A1* | 1/2022 | Oetting | G06T 11/00 |

FOREIGN PATENT DOCUMENTS

TW 201800773 A * 1/2018

* cited by examiner

*Primary Examiner* — Jeffery A Brier
(74) *Attorney, Agent, or Firm* — Isidore PLLC

(57) ABSTRACT

An electronic device, computer program product, and method enhance an augmented reality (AR) display by visually tethering notification content to an identified object. The electronic device includes at least one network interface that communicatively connects the electronic device to the AR display device. A controller of the electronic device is communicatively coupled to the at least one network interface. The controller receives an image stream from a field of view (FOV) of the AR display device. The controller identifies at least one object within the image stream. The controller generates notification content associated with a particular object of the at least one object. The controller presents, at the AR display device, the notification content visually tethered to the particular object.

20 Claims, 11 Drawing Sheets ically coupled and tethered by electrical
ELECTRONIC DEVICE THAT PRESENTS LOCATION-TETHERED AUGMENTED REALITY NOTIFICATIONS

BACKGROUND

1. Technical Field

The present disclosure relates generally to electronic devices, and more particularly to electronic devices that present augmented reality display content.

2. Description of the Related Art

Augmented reality (AR) technology has been integrated into user worn eyeglasses and other user worn devices to provide a heads up display that is positioned before the eyes of a user. The AR technology combines natural imagery with displayed content to assist users and provide the user with a more intuitive, immersive experience. AR glasses or goggles track the head position and location of the device wearer to provide relevant information, such as navigation directions. With only the head tracking and perhaps verbal commands, available AR technology such as AR glasses provide limited functionality. AR technology largely remains unadopted by the vast majority of users of mobile devices.

By contrast, user communication devices such as smartphones present a wide variety of functions such as communication services, media content presentation, productivity applications, etc. The user communication device enables functions provided directly by the communication device as well as functions provided by other devices that are communicatively connected to the communication device. Users rely upon the communication devices for many uses. However, the majority of these functions require the user to look at the display device, which the user is not able to do while the user is observing or paying attention on other objects around the user. When moving or performing certain activities, a user may not be able to devote attention to the display device of the communication device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
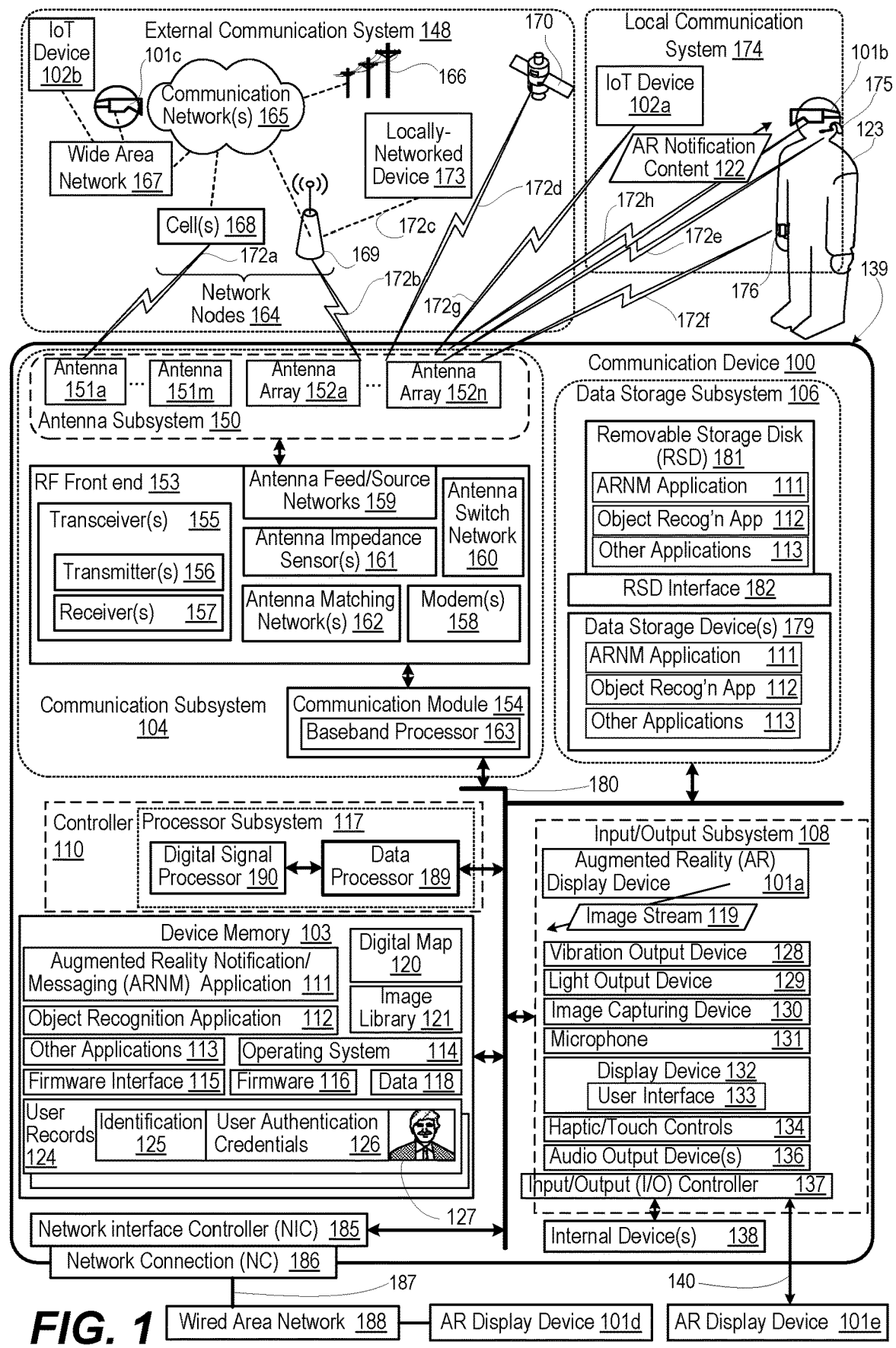
FIG. 1 depicts a functional block diagram of a communication environment including a communication device having components that provides augmented reality (AR) notifications at AR display device(s), and within which the features of the present disclosure are advantageously implemented, according to one or more embodiments.

According to a first aspect of the present disclosure, an electronic device, a computer program product, and a method enhance an augmented reality (AR) display by visually tethering notification content to an identified object. The electronic device includes at least one network interface that communicatively connects the electronic device to the AR display device. A controller of the electronic device is communicatively coupled to the at least one network interface. The controller receives an image stream from a field of view (FOV) of the AR display device. The controller identifies at least one object within the image stream. The controller generates notification content associated with a particular object of the at least one object. The controller presents, at the AR display device, the notification content visually tethered to the particular object.

In one aspect of the present disclosure, the electronic device provides AR notification content for both active and passive objects. The electronic device is communicatively connectable to active devices but is not communicatively connectable to passive objects. In one or more embodiments, active devices are user configurable via the electronic device. Electronic device communicatively connects to active objects to obtain and present operational status of the object(s) and other types of information to a person wearing the AR display device. Operational status may include active status, inactive status, a particular mode of operating such as dry cycle, or sensor condition such as alert triggered or alert not triggered. For passive objects, the communication device may automatically recognize the object by referring to an image library of known types of objects. The image library can be locally stored on the communication device or accessible via the connected network. Alternatively, or in addition, the communication device may not automatically recognize the object but receive a designation of what the object is or a name to assign to the object by a user input received at the AR display device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts a functional block diagram of an electronic device, specifically communication device 100, that provides AR notifications at augmented reality (AR) display device(s) 101a— 101e (collectively 101), within an operating environment in which several of the features of the present disclosure are advantageously implemented. Referring now to the specific component makeup and the associated functionality of communication device 100. Communication device 100 is communicatively coupled to integral device 101a, local wireless device 101b, cellular device (101c), wired network device 101d, and tethered peripheral device 101e, which are collectively referred to herein as AR display device(s) 101a— 101e. Communication device 100 enables one or more of AR display device(s) 101a— 101e to provide a more intuitive and informative user interface for passive objects as well as for active objects such as Internet of things (IoT) devices 102a-102b (collectively 102). In one or more embodiments, communication device 100 includes device memory 103, communication subsystem 104, data storage subsystem 106, and input/output (I/O) subsystem 108. Device memory 103 and each subsystem (104, 106, and 108) are managed by controller 110. Device memory 103 includes program code for applications, such as augmented reality notification and messaging (ARNM) application 111, object recognition application 112, and other application(s) 113. Device memory 103 further includes operating system (OS) 114, firmware interface 115, such as basic input/output system (BIOS) or Uniform Extensible Firmware Interface (UEFI), and firmware 116.

Controller 110 includes processor subsystem 117, which executes program code to provide operating functionality of communication device 100 that associates and communicates AR notification content tethered to active and passive objects within a field of view of AR display device(s) 101a-101e. The software and/or firmware modules have varying functionality when their corresponding program code is executed by processor subsystem 117 or secondary processing devices within communication device 100. Processor subsystem 117 of controller 110 can execute program code of ARNM application 111, object recognition application 112, and other application(s) 113 to configure communication device 100 to perform specific functions. Device memory 103 can include data 118 used by the applications. In one or more embodiments, controller 110 executes ARNM application 111 to configure communication device 100 to receive image stream 119 from a particular one of AR display device(s) 101a-101e. ARNM application 111 maintains digital map 120 and image library 121 of passive and active objects. Digital map 120 may include three-dimensional locations of objects defined in geospatial coordinates or relative vector locations from interior references. Digital map 120 may include exterior topographical features and interior obstructions such as walls, ceilings, floors, doors, and furniture. Image library 121 includes one or more of visual representations and three-dimensional shape representations of objects. The representations may include dimensional data. Each representation may be tagged with identification data of a type of object or a specific object.

In one or more embodiments, digital map 120 and image library 121 are sent to communication device 100. In an example, communication device 100 downloads image library 121 from a network server and downloads digital map 120 from a home automation system that is linked to local active objects. In another example, communication device 100 generates or updates digital map 120 and image library 121. In an example, communication device 100 generates or updates digital map 120 using location data obtained from location services, such as by receiving signals from GPS satellites 170 or triangulating from base nodes 164. Objects identified in image streams 119 may be represented with identification and location in digital map 120. Still images extracted from image streams 119 may be added to image library 121. ARNM application 111 generates notification content 122 that is communicated to a particular one of AR display device(s) 101a-101e for presenting to person 123 who is wearing the particular one of AR display device(s) 101a-101e. In one or more embodiments, ARNM application 111 attempts to authenticate person 123 by accessing user records 124 that may contain identification information 125, user authentication credentials 126, and/or biometric information such as a digital image 127.

I/O subsystem 108 includes user interface components such as vibration output device 128, light output device 129, image capturing device(s) 130, microphone 131, display device 132 that presents user interface 133, touch/haptic controls 134, and audio output device(s) 136. In an example, image capturing device(s) 130 are front and back cameras. In another example, image capturing device(s) 130 are on the same side but have different lenses such as two different ones of telephoto, wide angle, macro, or general purpose lenses. I/O subsystem 108 also includes I/O controller 137.

I/O controller 137 provides communication and power signals to functional components described herein as part of device memory 103, communication subsystem 104, data storage subsystem 106, or I/O subsystem 108. I/O controller 137 connects to internal devices 138, which are internal to housing 139, and via electrical cable 140 to tethered peripheral devices such as AR display device 101e, which are external to housing 139 of communication device 100. Internal devices 138 include computing, storage, communication, or sensing components depicted within housing 139. I/O controller 137 supports the necessary configuration of connectors, electrical power, communication protocols, and data buffering to act as an interface between internal devices 138 and peripheral devices, such as AR display device 101e, and other components of communication device 100 that use a different configuration for inputs and outputs.

Communication device 100 may be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the communication components and features of communication device 100. Communication subsystem 104 of communication device 100 enables wireless communication with external communication system 148. Communication subsystem 104 includes antenna subsystem 150 having lower band antennas 151a-151m and higher band antenna arrays 152a-152n that can be attached in/at different portions of housing 139. Communication subsystem 104 includes radio frequency (RF) front end 153 and communication module 154. RF front end 153 includes transceiver(s) 155, which includes transmitter(s) 156 and receiver(s) 157. RF front end 153 further includes modem(s) 158. RF front end 153 includes antenna feed/source networks 159, antenna switch network 160, antenna impedance sensor(s) 161, and antenna matching network(s) 162. Communication module 154 of communication subsystem 104 includes baseband processor 163 that communicates with controller 110 and RF front end 153. Baseband processor 163 operates in a baseband frequency range to encode data for transmission and decode received data, according to a communication protocol. Modem(s) 158 modulate baseband encoded data from communication module 154 onto a carrier signal to provide a transmit signal that is amplified by transmitter(s) 156. Modem(s) 158 demodulates each signal received from external communication system 148 using by antenna subsystem 150. The received signal is amplified and filtered by receiver(s) 157, which demodulate received encoded data from a received carrier signal. Antenna feed/source networks 159 transmits or receives from particular portions of antenna subsystem 150 and can adjust a phase between particular portions of antenna subsystem 150. Antenna switch network 160 can connect particular combinations of antennas (151a-151m, 152a-152n) to transceiver(s) 155. Controller 110 can monitor changes in antenna impedance detected by antenna impedance sensor(s) 161 for determining portions of antenna subsystem 150 that are blocked. Antenna matching network(s) 162 are connected to particular lower band antennas 151a-151m to tune impedance respectively of lower band antennas 151a-151m to match impedance of transceiver(s) 155. Antenna matching network(s) 162 can also be used to detune the impedance of lower band antennas 151a-151m to not match the impedance of transceiver(s) 155 to electromagnetically isolate a particular antenna.

In one or more embodiments, controller 110, via communication subsystem 104, performs multiple types of over-the-air (OTA) communication with network nodes 164 of external communication system 148. Particular network nodes 164 can be part of communication networks 165 of public land mobile networks (PLMNs) that provide connections to plain old telephone systems (POTS) 166 for voice calls and wide area networks (WANs) 167 for data sessions. WANs 167 can include Internet and other data networks to communication device 100, AR display device 101c, and IoT device 102b. The particular network nodes 164 can be cellular "cells", base nodes, or base stations 168 that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas (151a-151m, 152a-152n) are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 164 can be access node(s) 169 that support wireless OTA communication. Communication subsystem 104 can receive OTA communication from location services such as provided by global positioning system (GPS) satellites 170. Communication subsystem 104 communicates via OTA communication channel(s) 172a with base stations 168. Communication subsystem 104 communicates via wireless communication channel(s) 172b with access node(s) 169. In one or more particular embodiments, access node(s) 169 supports communication using one or more IEEE 802.11 wireless local area network (WLAN) protocols. Wi-Fi™ is a family of wireless network protocols, based on the IEEE 802.11 family of standards, which are commonly used between user devices and network devices that provide Internet access. In one or more particular embodiments, communication subsystem 104 communicates with one or more locally networked devices 173 via wired or wireless link 172c provided by access node(s) 169. Communication subsystem 104 receives GPS signal(s) 172d broadcast by GPS satellites 170 to obtain geospatial location information.

In one or more embodiments, controller 110, via communication subsystem 104, performs multiple types of OTA communication with local communication system 174. In one or more embodiments, local communication system 174 includes wireless headset 175 and smart watch 176 that are coupled to communication device 100 to form a personal access network (PAN). Communication subsystem 104 communicates via low power wireless communication channel(s) 172e with wireless headset 175. Communication subsystem 104 communicates via second low power wireless communication channel(s) 172f, such as Bluetooth, with smart watch 176 such as used by person 123. Communication subsystem 104 communicates via wireless mesh protocols via communication channel 17g to IoT device 102a. In an example, the mesh protocol is Zigbee, which is a short-range, low-power, wireless standard (IEEE 802.15.4). Communication subsystem 104 wireless communicates with AR display device 101b via communication channel(s) 172h using a protocol that supports image stream 119 and notification content 122.

Data storage subsystem 106 of communication device 100 includes data storage device(s) 179. Controller 110 is communicatively connected, via system interlink 180, to data storage device(s) 179. Data storage subsystem 106 provides applications, program code, and stored data on nonvolatile storage that is accessible by controller 110. For example, data storage subsystem 106 can provide a selection of applications and computer data such as ARNM application 111, object recognition application 112, and other application(s) 113 that support or enhance the functionality of AR display device(s) 101a-101e. These applications can be loaded into device memory 103 for execution by controller 110. In one or more embodiments, data storage device(s) 179 can include hard disk drives (HDDs), optical disk drives, and/or solid-state drives (SSDs), etc. Data storage subsystem 106 of communication device 100 can include removable storage device(s) (RSD(s)) 181, which is received in RSD interface 182. Controller 110 is communicatively connected to RSD 181, via system interlink 180 and RSD interface 182. In one or more embodiments, RSD 181 is a non-transitory computer program product or computer readable storage device. Controller 110 can access RSD 181 or data storage device(s) 179 to provision communication device 100 with program code, such as code for ARNM application 111, object recognition application 112, and other application(s) 113.

In one or more embodiments, I/O subsystem 108 includes network interface controller (NIC or "network interface") 185 with a network connection (NC) 186. Network cable 187 connects NC 186 to wired area network 188. NIC 185 can be referred to as a "network interface" that can support one or more network communication protocols. Wired area network 188 can be a local area network (LAN), a campus area network (CAN), a metropolitan area network (MAN), or a wide area network (WAN). For example, NC 186 can be an Ethernet connection. AR display device 101d is communicatively coupled to wired area network 188.

Controller 110 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 110 includes processor subsystem 117, which includes one or more central processing units (CPUs), depicted as data processor 189. Processor subsystem 117 can include one or more digital signal processors 190 that are integrated with data processor 189. Processor subsystem 117 can include other processors that are communicatively coupled to data processor 189, such as baseband processor 163 of communication module 154. In one or embodiments that are not depicted, controller 110 can further include distributed processing and control components that are external to housing 139 or grouped with other components, such as I/O subsystem 108. Data processor 189 is communicatively coupled, via system interlink 180, to device memory 103. In one or more embodiments, controller 110 of communication device 100 is communicatively coupled via system interlink 180 to communication subsystem 104, data storage subsystem 106, and I/O subsystem 108.

System interlink 180 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 180) are illustrated in FIG. 1, it is to be understood that more, fewer, or different interconnections may be present in other embodiments.

Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Figure 2A:
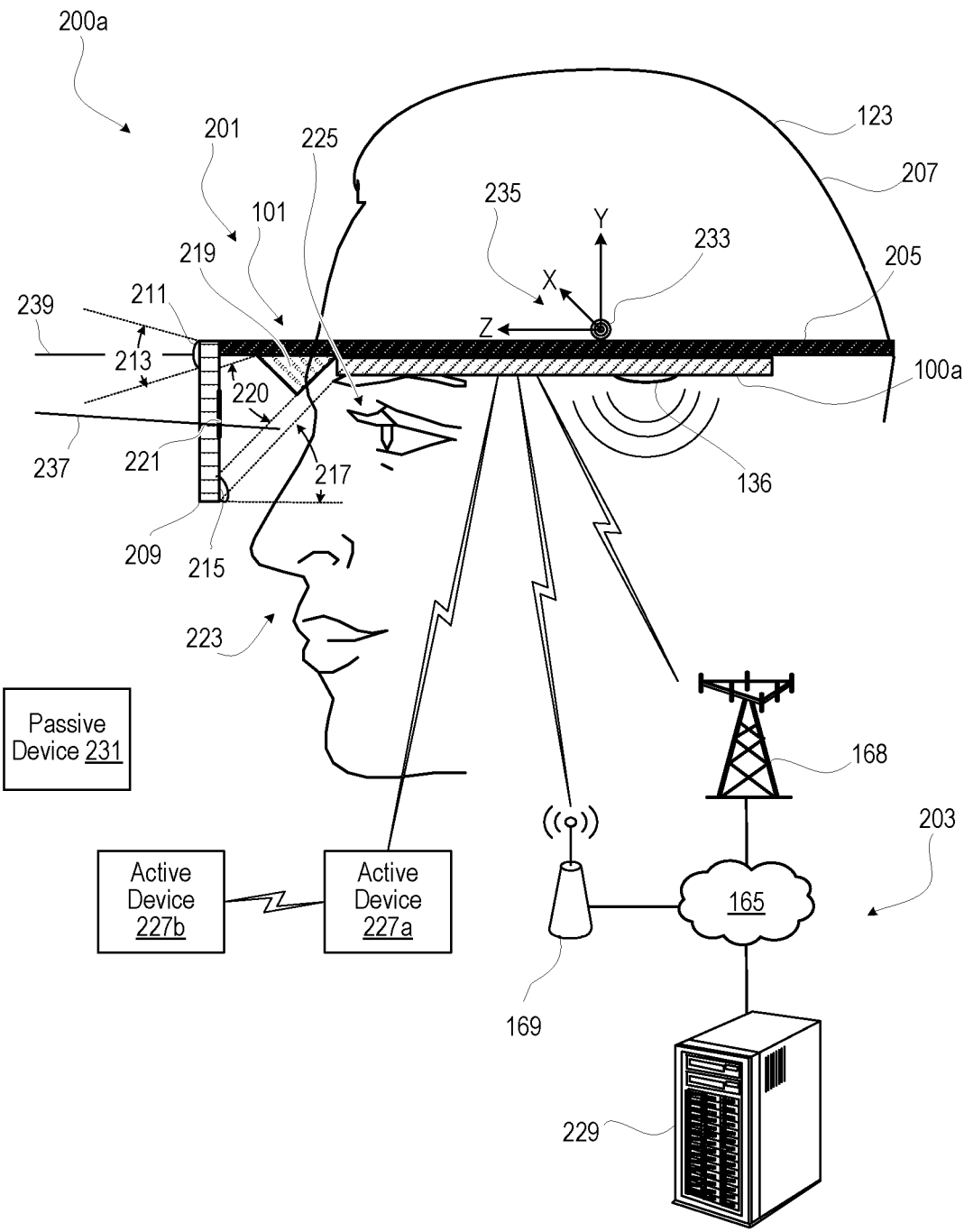
FIG. 2A depicts a first communication environment with an example communication device in communication with an AR display device assembly and in communication with a communication network, according to one or more embodiments.

FIG. 2A depicts first communication environment 200a with AR display device assembly 201 in communication with communication network 203. AR eyeglass assembly 201 includes communication device 100a having integrated AR display device 101a. Communication device 100a is an implementation of communication device 100 of FIG. 1 and may have similar or identical components. Communication device 100a includes components that are compatible with a form factor for an article that is to be worn, carried, or stowed in a clothing pocket by person 123. In an example, AR eyeglass assembly 201 includes visor or eyeglasses frame 205 that is received on head 207 of person 123 and supports communication device 100a and AR display device 101a having optical components. These optical components include: (i) lenses 209; (ii) first camera 211 that is forward oriented with a first FOV 213; (iii) second camera 215 that is aft oriented with a second FOV 217; and (iv) AR projector 219 having a field of focus 220 to project AR imagery 221 on lenses 209. In one or more embodiments, lenses 209 include an electrochromatic material that darkens in response to a control signal. Communication device 100a may monitor an image stream from first camera 211 for an ambient light measurement. Communication device 100a may monitor an image stream from second camera 215 for imaging a portion of face 223 of person 123, such as for facial recognition or for detecting eye glance direction and eyelid position of eyes 225.

Communication device 101a supports one or more over-the-air (OTA) communication protocols. In an example, communication device 101a communicates using a mesh protocol directly with active device 227a and indirectly with active device 227b via active device 227a. In another example, communication device 101a communicates using cellular protocol with cell 168 and communication network 165 to obtain notification content from network server 229. In an additional example, communication device 101a communicates via wireless protocol with access point 169 and communication network 165 to obtain notification content from network server 229. Communication device 101a generates AR imagery 221 to include notification content visually tethered to one of active objects 227a/227b or passive object 231. Network interface 185 communicatively connects communication device 100a to AR display device 101a to receive image stream from FOV 213 of AR display device 101a. Controller 110 (FIG. 1) identifies at least one object within the image stream, generates notification content associated with a particular object of the at least one object, and presents, at AR display device 101, the notification content visually tethered to the particular object. In one or more embodiments, communication device 100a supports "hands-free" audio presentation and communication services via audio output device 136 or 175 (FIG. 1). According to aspects of the present disclosure, communication device 100c enables and assists person 123 to be more mobile. Person 123 can move and keep local objects within view while being provided AR notification content relevant to these local objects by AR display device 101b.

Communication device 100a may use one or more techniques to identify active objects 227a/227b or passive object 231 by identifying a gaze direction of AR display device 101a. AR eyeglass assembly 201 includes communication device 100a having integrated AR display device 101a that translate and rotate with head 207. Communication device 100a may determine where head location 233 and head orientation 235 are relative to an interior space or relative to geospatial coordinates. As a first approximation of gaze direction 237 by person 123, boresight 239 of first image capturing device 211 within FOV 213 is oriented generally in line when eyes 225 are gazing straight ahead. As a second approximation of gaze direction 237, second image capturing device 215 directly detects gaze direction 237 of eyes 215.

Figure 2B:
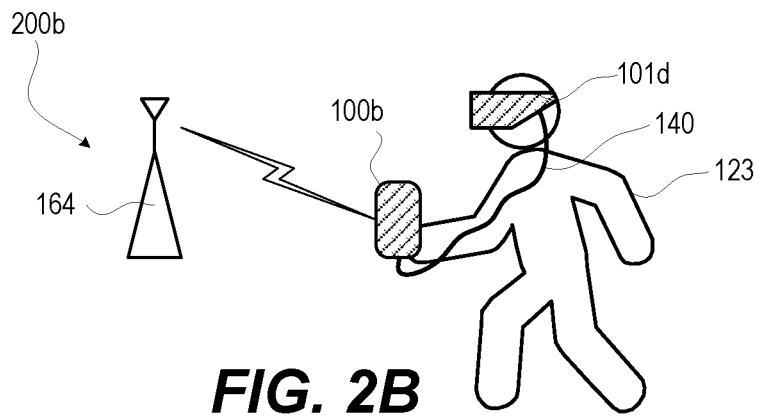
FIG. 2B depicts a second communication environment with an AR display assembly that includes an AR display device communicatively coupled and tethered by electrical cable to the communication device, according to one or more embodiments.

FIG. 2B depicts second communication environment 200b with tethered AR display assembly 201b that includes AR display device 101d communicatively coupled and tethered by electrical cable 140 to communication device 100b. Communication device 100b connects to network node 164 for notification content and communication services. Communication device 100b is an implementation of communication device 100 of FIG. 1 and may have similar or identical components. Communication device 100b includes components that are compatible with a form factor for an article that is to be worn, carried, or stowed in a clothing pocket by person 123. Communication device 100b provides additional user interface features, communication capabilities, additional stored battery power, and content presentation features to AR display device 101d.

Figure 2C:
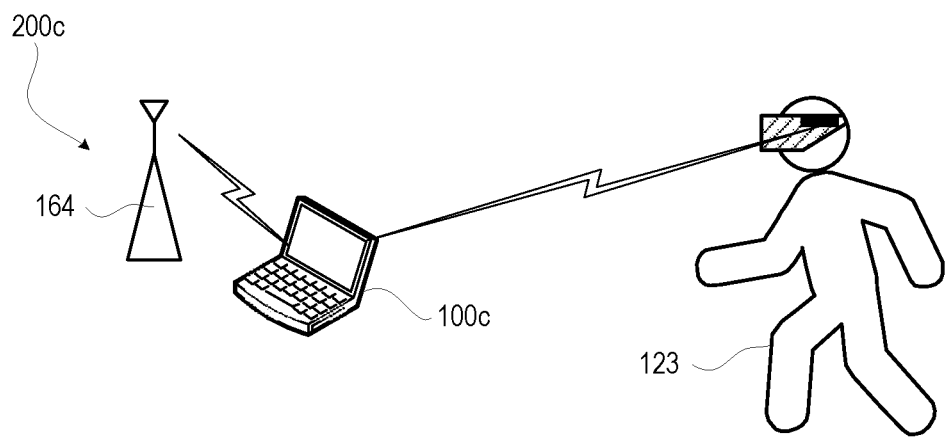
FIG. 2C depicts a third communication environment with an AR display device communicatively coupled via a wireless connection to the communication device, according to one or more embodiments.

FIG. 2C depicts third communication environment 200c with AR display device 101b communicatively coupled wirelessly to communication device 100c. Communication device 100c connects to network node 164 for notification content and communication services. Communication device 100c is an implementation of communication device 100 of FIG. 1 and may have similar or identical components. Communication device 100c includes components that are compatible with a form factor for fixed, portable, or mobile hand-carried implementations.

Figure 2D:
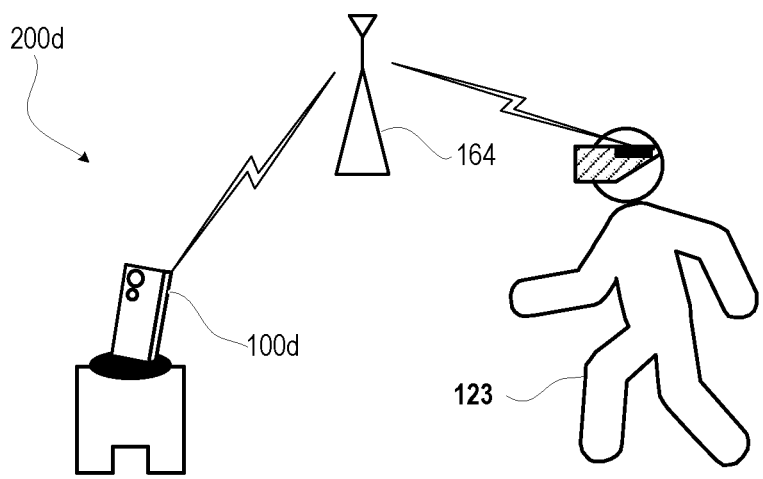
FIG. 2D depicts a fourth communication environment with an AR display device communicatively coupled via an over-the-air connection to the communication device, according to one or more embodiments.

FIG. 2D depicts fourth communication environment 200d with AR display device 101c communicatively coupled over-the-air to communication device 100d via one or more network nodes 164. Communication device 100c connects to network node 164 for notification content and communication services. The communication services include connecting to AR display device 101c. Communication device 100d is an implementation of communication device 100 of FIG. 1 and may have similar or identical components. Communication device 100d includes components that are compatible with a form factor for fixed, portable, or mobile hand-carried implementations.

Figure 3A:
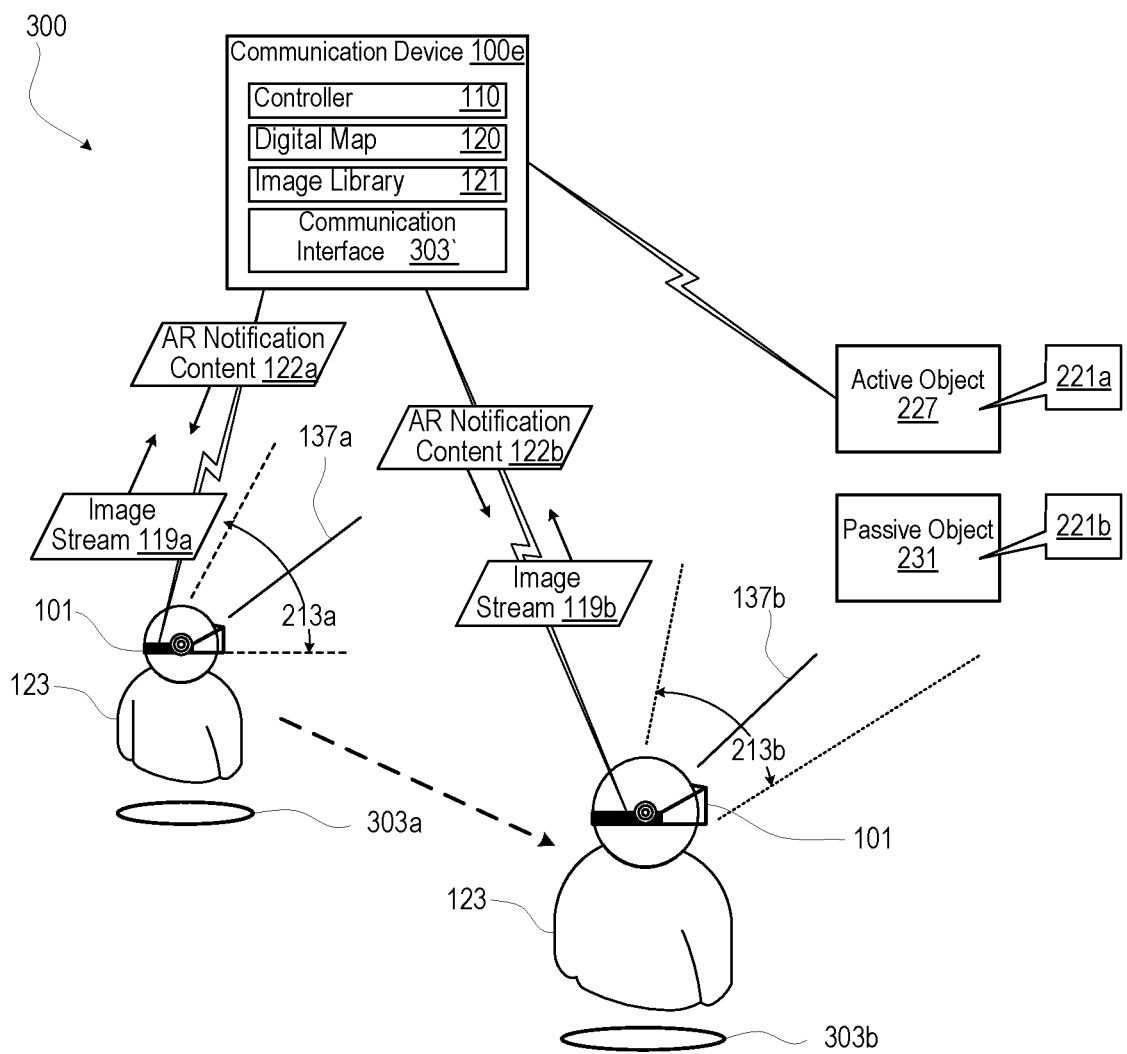
FIG. 3A depicts a fifth communication environment with the communication device sequentially providing AR notification content to the AR display device, according to one or more embodiments.

FIG. 3A depicts fifth communication environment 300 with communication device 100e that sequentially provides AR notification content 122a-122b to AR display device 101. AR notification content 122a-122b appears as AR imagery 221a-221b visually tethered respectively to active object 227 and passive object 231. Communication device 100e is an implementation of communication device 100 of FIG. 1 and may have similar or identical components. Communication device 100e includes components that are compatible with a form factor for fixed, portable, or mobile hand-carried implementations. AR display device 101, worn by person 123, is initially at location 303a and has FOV 213a that encompasses active object 227 and passive object 231. Communication subsystem 104 of communication device 100 communicatively connects communication device 100 to AR display device 101. Controller 110 of communication device 100 receives image stream 119a from AR display device 101. Controller 110 identifies objects within image stream 119a, including active object 227 and passive object 231. To identify active object 227 and passive object 231, controller 110 can perform object recognition and identification using image library 121 (FIG. 1), determine a location of one of active object 227 and passive object 231 that corresponds to digital map 120 (FIG. 1) of objects, or receive a designation from AR display device 101 that identifies the object. In an example, AR display device 101 can select AR notification content 122a that is to be visually tethered to passive object 227. Controller 110 receives image stream 119b as person 123 moves to location 303b. Controller 110 maintains this virtual positioning as AR display device 101 moves to location 303b with FOV 213b. Controller 110 communicates AR notification content 122b with repositioning of AR imagery 221a-221b to correspond to repositioning of active and passive objects 227 and 231 within FOV 213b. When FOV 213a-213b changes to not encompass active object 227 and/or passive object 231, the corresponding AR imagery 221a-221b is not presented by AR display device 101. In one or more embodiments, AR display device 101 is not equipped to directly interface with active object 227. Communication device 100 provides AR imagery 221a, which enables person 123 to interact with active object 227. Controller 110 may identify active object 227 and passive object 231 within image streams 119a-119b in part by determining respective gaze directions 137a-137b of AR display device 101 that is a function of head location 233 and head orientation 235 (FIG. 2A).

Figure 3B:
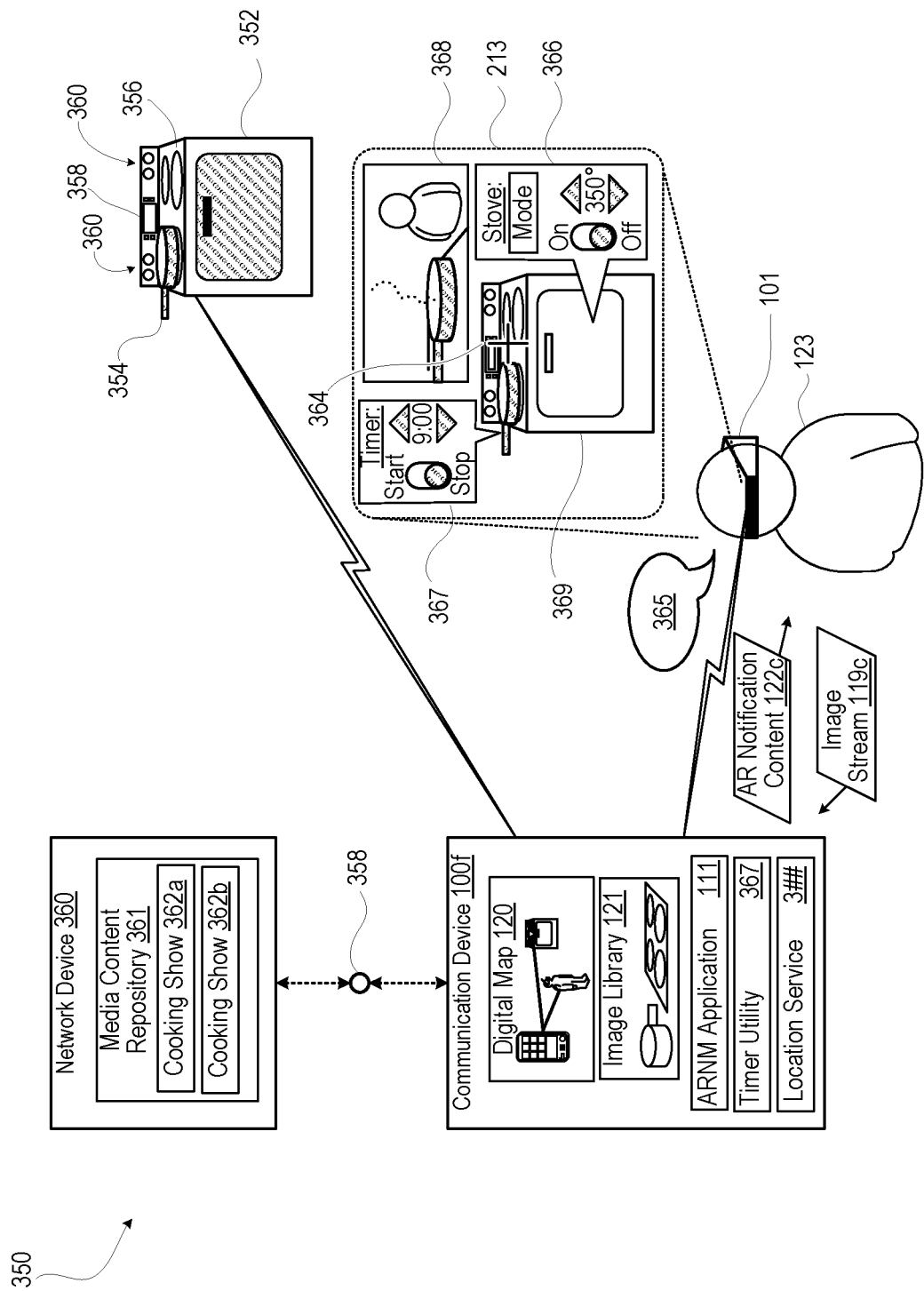
FIG. 3B depicts a sixth communication environment with the communication device presenting object-tethered AR notification content via the AR display device, according to one or more embodiments.

FIG. 3B depicts sixth communication environment 350 with communication device 100f providing AR notification content 122c that is presented at AR display device 101. Person 123 who wears AR display device 101 is looking at stove 352 having skillet 354 on range top 356. Communication device 100f is able to communicate with stove controls 358 of stove 352. By contrast, range top 356 has manual controls 360. Skillet 354 and range top 356 are passive devices. AR display device 101 has FOV 213 captured in image stream 119c that encompasses stove 352, skillet 354, and range top 356. AR display device 101 communicates image stream 119c to communication device 100f. Communication device 100f may identify stove 352 at least in part with reference to digital map 120 that identifies a respective device type and location of active devices in communication with communication device 100f. Digital map 120 may also contain similar information for passive devices that are user identified. Communication device 100f also may recognize active and passive objects at least in part by comparing objects within image stream against reference image library 121. Images in image library 121 may be of a similar type or be actual pictures of stove 352, skillet 354, and range top 356. In one embodiment, communication device 100 connects via network 358 to network device 360 to receive AR notification content that can include digital map 120 and image library 121. Communication device 100 may also access media content repository 361 for media content such as cooking show videos 362a-362b.

Person 123 can designate objects for adding to digital map 120 and image library 121. In an example, AR display device 101 presents a reticle or cross hairs 364 to the person 123 wearing the AR display device 101. By manually aligning the reticle or cross hairs 364 on a particular object and producing speech 365 of one or more audible commands, person can define for communication device 100 an identity for the particular object or location such as stove 352, skillet 354, and range top 356. Communication device 100 may automatically identify status information and user interface controls 366 for active devices such as stove 352 to include in AR notification content 122c. Person 123 may select timer utility 367 on communication device 100 and video presentation content such as cooking show 360a from network device 358 to visually tether to skillet 354 in presentation window 368. At lenses of AR display device 101, natural imagery 369 of stove 352, skillet 354, and range top 356 is combined with AR imagery (366-368), which includes notification content.

Figure 4:
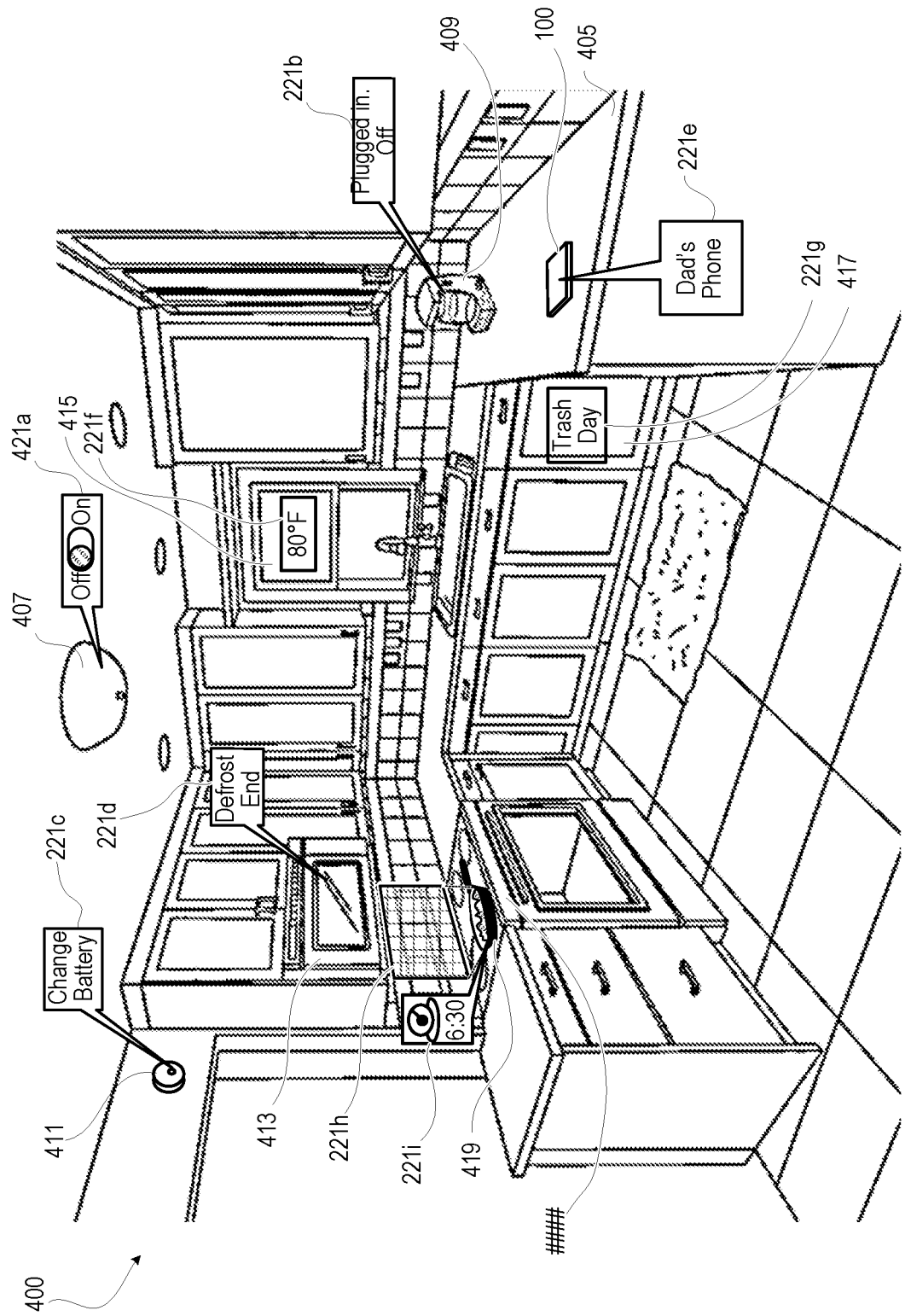
FIG. 4 depicts a perspective AR scene as viewed by an AR display device with object-tethered AR notification content visually presented as AR imagery, according to one or more embodiments.

FIG. 4 depicts a perspective AR scene 400 as viewed by AR display device 101 (FIG. 3A) with visually tethered AR notification content presented as AR imagery 221a-221i. Communication device 100 is located on counter 405 and is communicatively connectable to active objects, including: (i) light 407; (ii) coffee maker 409; (iii) smoke detector 411; and (iv) microwave 413. Communication device 110 tracks visual, relative, or absolute locations of passive objects: (i) window 415; (ii) trash receptacle 417; and (iii) skillet 419. In an example, communication device 100b matches known object types or known objects in image library 121 with objects viewed by AR display device 101 (FIG. 3A). In another example, communication device 100 identifies objects viewed by AR display device 101 (FIG. 3A) at least in part by matching a location of AR scene 400 with digital map 120. Communication device 100 associates AR notification content with particular objects. In another example, communication device 101 wirelessly communicates with active objects such as microwave 413 and can determine relative direction and distance based on communication signals. By one or more of determining the relative direction and distance to AR display device 101 (FIG. 3A), FOV 213 (FIG. 3A), and objects encompassed by image stream 119 (FIG. 1), communication device 100 can virtually tether AR imagery 221a-221i in AR notification content 122 (FIG. 1) communicated to AR display device 101 (FIG. 3A). In an example, AR imagery 221a provides a user interface control toggle for light 407. AR imagery 221a is visually tethered to light 407, appearing on or adjacent to light 407 as a viewing vantage point of AR display device 101 (FIG. 3A) moves. AR imagery 221b provides a user interface control display for coffee maker 409. AR imagery 221 is visually tethered to coffee maker 409. AR imagery 221c provides a user interface status display for smoke detector 411 and is visually tethered to smoke detector 411. In one or more embodiments, smoke detector 411 may be a smart IoT device that can be automatically controlled by communication device 100 (FIG. 1) to ignore cooking smoke when conditions indicate no hazard. These conditions can include: (a) person 123 (FIG. 3A) is present; (b) food is cooking on skillet 419; and (c) verbal command is received from person 123 (FIG. 3A). AR imagery 221d provides a user interface control display for microwave 413 when powered on, and AR imagery 221d is visually tethered to microwave 413. Communication device 100 also presents AR imagery 221e at AR display device 101 (FIG. 1) that is visually tethered to communication device 100. In one or more embodiments, communication device 100 updates location and status of passive and active devices. In example, communication device 100 locates coffee maker 409 by wireless communication and associates an image of coffee maker 409 that matches the location. When/if coffee maker 409 is subsequently unplugged, communication device 100 determines that coffee maker 409 is not available for communication but does recognize coffee maker 409 in an image stream from AR display device 101 (FIG. 3A) as matching a previously location matched image. AR imagery 221b can be changed to indicate the unplugged/off status of coffee maker 409.

For passive objects, communication device 100 may automatically associate AR notification content that would benefit person 123 (FIG. 3A). In an example, communication device 100 recognizes window 415, associates a local weather application with viewing window 415 from inside, and presents AR imagery 221f tethered to window 415 presenting weather-related information, such as the outside temperature. AR imagery 221f indicates outside weather conditions and providing controls for additional information. In another example, communication device 100 has been previously instructed where trash receptacle 417 is and when and where to remind person 123 (FIG. 3A) by visually tethering AR imagery 221g to trash receptacle 417. Communication device 100 can associate AR notification content with skillet 419, such as by selection by person 123 (FIG. 3A) using user interface 133 (FIG. 1) or AR display device 101 (FIG. 3A). In an additional example, AR imagery 221h visually tethered to skillet 419 provides video cooking instructions, and AR imagery 221i visually tethered to skillet 419 provides a timer. In one or more embodiments, streaming media such as AR imagery 221h can pause playback when skillet 419 is not in the FOV and then resume when skillet 419 is back in the FOV.

Figure 5:
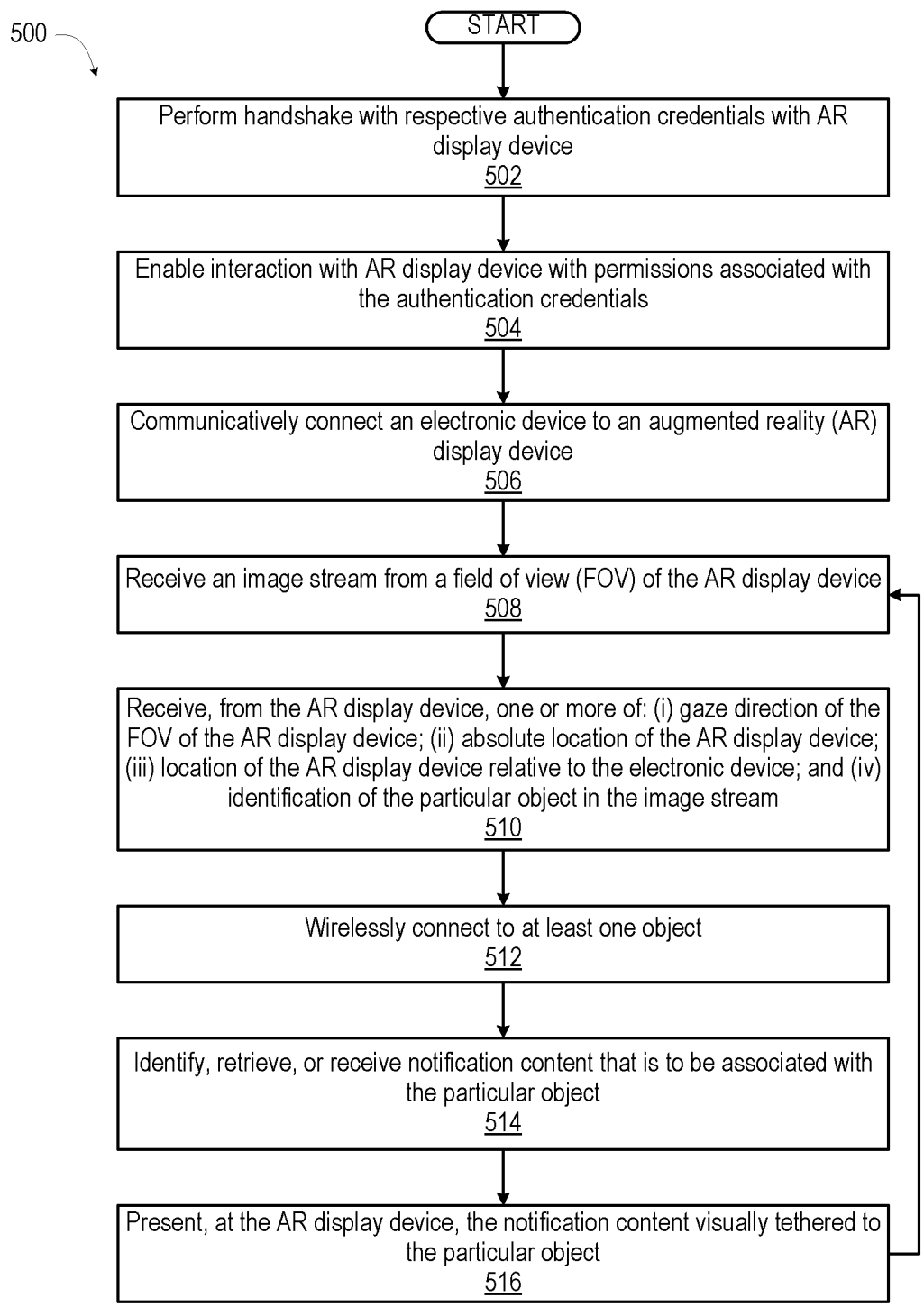
FIG. 5 depicts a flow diagram of a method performed by a communication device for providing AR notification content tethered to objects identified within a field of view of an AR display device, according to one or more embodiments.
Figure 6:
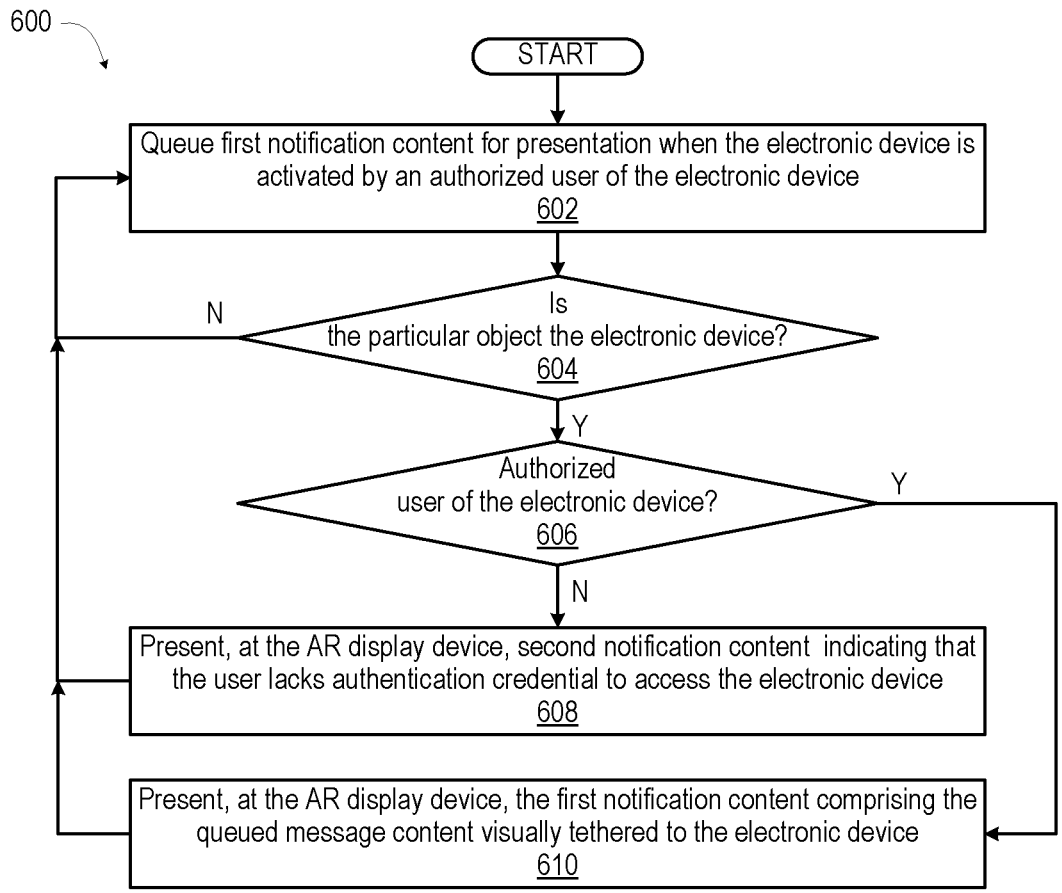
FIG. 6 depicts a flow diagram of a method performed by a communication device for authenticating a person wearing the AR display device to enable selective tethering of user-specific notification for the authenticated user, according to one or more embodiments.
Figure 7:
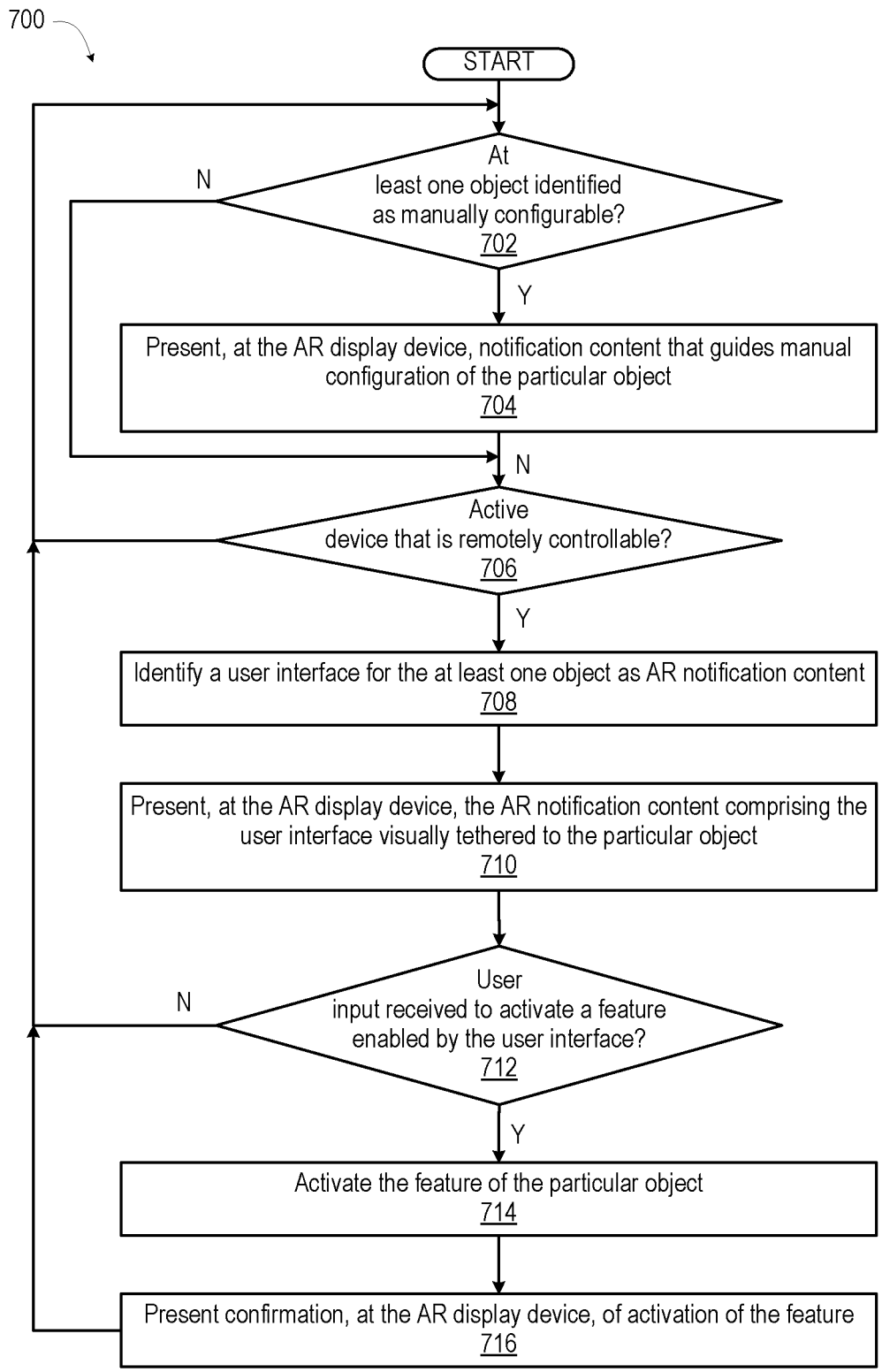
FIG. 7 depicts a flow diagram of a method performed by a communication device for user configuring an active/configurable object by a person wearing the AR display device, according to one or more embodiments.
Figure 8A:
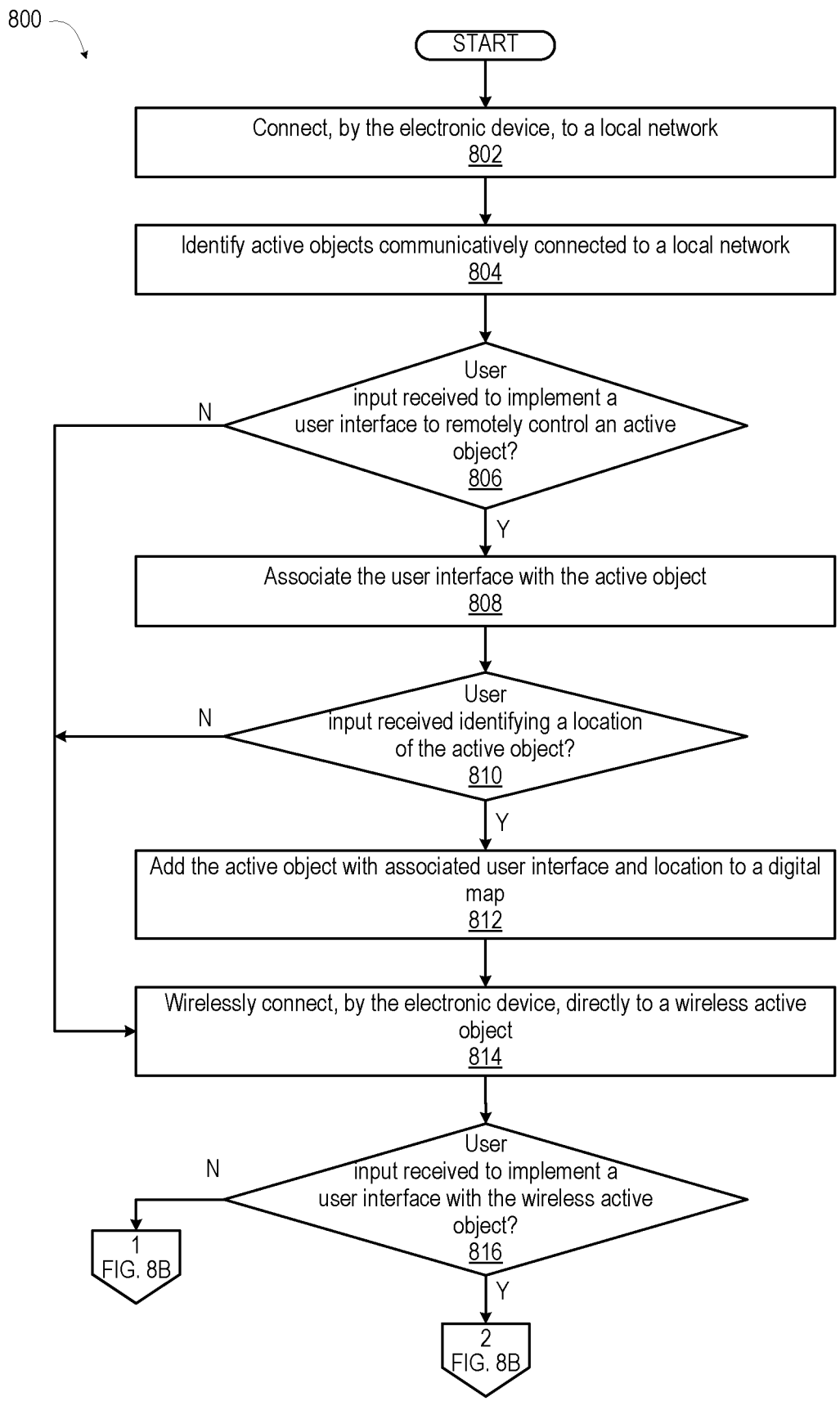
FIGS. 8A-8B (collectively FIG. 8) present a flow diagram of a method performed by a communication device for updating a digital map with identified objects, according to one or more embodiments.
Figure 8B:
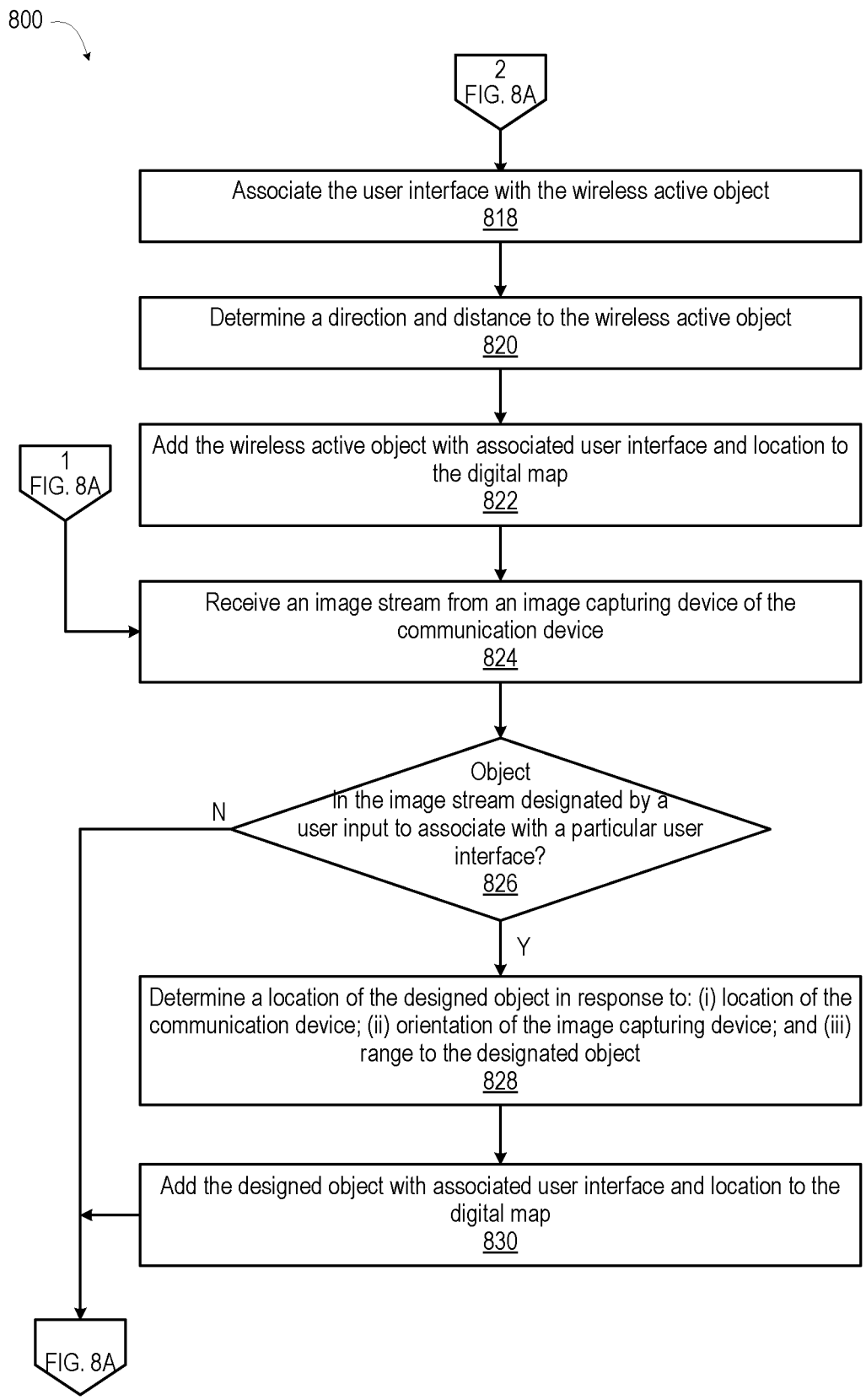

With reference now to the flow charts, there are presented method 500 (FIG. 5), method 600 (FIG. 6), method 700 (FIG. 7) and method 800 (FIGS. 8A-8B). FIG. 5 presents a flow diagram of method 500 performed by a communication device for providing AR notification content tethered to objects identified within a field of view of an AR display device. FIG. 6 presents a flow diagram of method 600 performed by a communication device for presenting AR notification content that is associated with and visually tethered to a passive or inactive device that is authorized for user configuration by a person wearing the AR display device. FIG. 7 presents a flow diagram of method 700 performed by a communication device for user configuring an active object by a person wearing the AR display device. FIGS. 8A-8B (collectively FIG. 8) present a flow diagram of method 800 performed by an electronic device such as the communication device for associating user interfaces with objects and for updating a digital map with identified objects. The descriptions of methods 500, 600, 700 and 800 are provided with general reference to the specific components illustrated within the preceding FIGS. 1, 2A-2D, 3-4, and specific components referenced in methods 500, 600, and 700 may be identical or similar to components of the same name used in describing preceding FIGS. 1, 2A-2D, 3-4. In one or more embodiments, controller 101 configures communication device 100 and AR display device 101 (FIG. 1) to provide functionality of methods 500, 600, 700, and 800.

With reference to FIG. 5, method 500 includes performing handshake with respective authentication credentials with AR display device (block 502). Method 500 includes enabling interaction with AR display device with permissions associated with the authentication credentials (block 504). Method 500 includes communicatively connecting an electronic device to an augmented reality (AR) display device (block 506). Method 500 includes receiving an image stream from a field of view (FOV) of the AR display device (block 508). Method 500 includes receiving, from the AR display device, one or more of: (i) gaze direction of the FOV of the AR display device; (ii) absolute location of the AR display device; (iii) location of the AR display device relative to the electronic device; and (iv) identification of the particular object in the image stream (block 510). Method 500 includes wirelessly connecting to at least one object (block 512). Method 500 includes identifying, retrieving, or receiving AR notification content that is to be associated with the particular object (block 514). In an example, the particular object is a passive object that is manually configurable by a person. The AR notification content may be a guide for instructing the person how to manually configure the particular object. The manual configuration may include preparation to operate, activating operation, or repairing for proper operation. Method 500 includes presenting, at the AR display device, the AR notification content visually tethered to the particular object (block 516). Then method 500 returns to block 508.

Method 600 provides additional functionality to method 500 (FIG. 5) and may operate in parallel with method 500 (FIG. 5). Method 600 covers the processes of generating and presenting queued notification content associated with or intended to be accessed by or presented to an authorized user of an electronic device. With reference to FIG. 6, method 600 includes queueing first notification content for presentation when the electronic device is activated by an authorized user of the electronic device (block 602). In an example, the first notification content is a message addressed to the authorized user. In another example, the first notification content is media content licensed specifically for use by the authorized user. In an additional example, the first notification content is private information about the authorized user. In a further example, the first notification content enables operation of a device or system owned by the authorized user, such as a security system or entry system. Method 600 includes determining whether a particular object is the electronic device requiring authentication of the user (decision block 604). In response to determining that a particular object is not an electronic device requiring user authentication, method 600 returns to block 602. In response to determining that a particular object is the electronic device requiring user authentication, method 600 includes determining whether the person equipped with the AR display device is an authorized user of the electronic device (decision block 606). In response to determining that the person equipped with the AR display device is not an authorized user of the electronic device, method 600 includes presenting, at the AR display device, second notification content visually tethered to the electronic device and indicating that the user lacks authentication credential to access the electronic device (block 608). Then method 600 returns to block 602. In response to determining that the person equipped with the AR display device is an authorized user of the electronic device, method 600 includes presenting, at the AR display device, second notification content comprising the queued message content visually tethered to the electronic device (block 610). Then method 600 returns to block 602. Then method 600 ends.

With reference to FIG. 7, method 700 provides additional functionality to method 500 (FIG. 5) and, may operate in parallel with method 500 (FIG. 5). Method 700 includes determining whether at least one object is identified as being manually configurable (decision block 702). In response to determining that at least one object is identified as being manually configurable, method 700 includes presenting, at the AR display device, notification content that guides manual configuration of the particular object (block 704). In response to determining that at least one object is not identified as being manually configurable or after block 704, method 700 includes determining whether a particular object of the at least one object within a FOV of the AR display device is an active device that is remotely controllable by the electronic device (decision block 706). In response to determining that the particular object of the at least one object is not remotely controllable by the electronic device method 700 returns to block 702. In response to determining that the particular object of the at least one object is remotely controllable by the electronic device, method 700 includes identifying a user interface for the at least one object as AR notification content (block 708). Method 700 includes presenting, at the AR display device, the AR notification content comprising the user interface visually tethered to the particular object (block 710). Method 700 includes determining whether a user input is received to activate a feature enabled by the user interface (decision block 712). The user input to activate a feature enabled by the user interface may be referred to as a user selection. In response to determining that a user input is not received to activate a feature enabled by the user interface, method 700 returns to block 702. In response to determining that a user input is received to activate a feature enabled by the user interface, method 700 includes activating the feature of the particular object (block 714). Method 700 includes presenting confirmation, at the AR display device, of activation of the feature (block 716). Then method 700 returns to block 702.

With reference to FIG. 8A, method 800 includes connecting, by the electronic device, to a local network (block 802). Method 800 includes identifying active objects communicatively connected to a local network (block 804). Method 800 includes determining whether a user input is received to implement a user interface at the electronic device to remotely control an active object via the local network (decision block 806). In response to not receiving a user input, method 800 proceeds to block 814. In response to receiving a user input, method 800 includes associating the user interface with the active object (block 808). Method 800 includes determining whether a user input is received identifying a location of the active object (decision block 810). In response to determining that the user input is received identifying the location of the particular active object, method 800 includes adding the active object with associated user interface and location to a digital map (block 812). In response to determining that the user input is not received identifying the location of the particular active object or after block 812, method 800 includes wirelessly connecting, by the electronic device, directly to a wireless active object (block 814). Method 800 includes determining whether a user input is received to implement a user interface at the electronic device to remotely control the wireless active object (decision block 816). In response to determining that a user input is not received to implement a user interface at the electronic device to remotely control the wireless active object, method 800 proceeds to block 824 (FIG. 8B). In response to receiving a user input, method 800 proceeds to block 818 (FIG. 8B).

With reference to FIG. 8B, method 800 includes associating the user interface with the wireless active object (block 818). Method 800 includes determining a direction and distance to the wireless active object (block 820). In an example, the communication subsystem of the electronic device determines the direction of a signal received from the wireless active object. In one or more embodiments, the electronic device is mobile, enabling determining distance by triangulating based on two directional measurements made at different locations. The controller may determine the distance in response to detecting data latency or received signal strength. Method 800 includes adding the wireless active object with associated user interface and location to the digital map (block 822).

In response to determining that a user input is not received in decision block 816 (FIG. 8A) or after block 822, method 800 includes receiving an image stream from an image capturing device of the electronic device (block 824). Method 800 includes determining whether an object in the image stream is designated by a user input to associate with a particular user interface (decision block 826). In response to determining that an object is designated/identified by the user input, method 800 includes determining a location of the designated/identified object in response to: (i) location of the electronic device; (ii) orientation of the image capturing device; and (iii) range to the designated object (block 828). Method 800 includes adding the designated object with associated user interface and location to the digital map (block 830). Then method 800 returns to block 802 (FIG. 8A). Returning to decision block 826, in response to determining that no object is designated/identified by the user input, method 800 returns to block 802 (FIG. 8A).

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
at least one network interface that communicatively connects the electronic device to an augmented reality (AR) display device; and
a controller communicatively coupled to the at least one network interface, and which:
receives an image stream from a field of view (FOV) of the AR display device;
identifies at least one object within the image stream;
generates notification content associated with a particular object of the at least one object;
queues the notification content for presentation when the electronic device is activated by an authorized user of the electronic device;
determines whether a person equipped with the AR display device is the authorized user; and
presents, at the AR display device, the notification content visually tethered to the particular object, in response to determining that the person equipped with the AR display device is the authorized user.

2. The electronic device of claim 1, wherein the controller:
wirelessly connects to the particular object; and
identifies the particular object at least in part by determining respective locations of the at least one object and the AR display device by signal direction and range finding.

3. The electronic device of claim 1, wherein, in identifying the at least one object within the image stream, the controller receives, from the AR display device, one or more of: (i) gaze direction of the FOV of the AR display device; (ii) absolute location of the AR display device; (iii) location of the AR display device relative to the electronic device; and (iv) identification of the particular object in the image stream.

4. The electronic device of claim 1, further comprising a communication subsystem by which the electronic device is communicatively connected to the particular object, wherein the controller:
communicatively connects to the particular object via the communication subsystem; and
activates a feature of the particular object in response to receiving a user input from a person equipped with the AR display device.

5. The electronic device of claim 1, wherein the controller:
identifies the particular object as being manually configurable; and
presents notification content that guides manual configuration of the particular object.

6. The electronic device of claim 1, wherein the controller:
presents the notification content associated with the particular object based on receiving a user selection of: (i) the notification content; and (ii) the particular object for presenting the notification content.

7. The electronic device of claim 1, wherein:
the notification content comprises streaming content that is presented as visually tethered to the particular object; and
the controller:
receives updates of the FOV of the AR display device; and
pauses presentation by the AR display device of the notification content visually tethered to the particular object in response to the particular object being outside of the FOV.

8. The electronic device of claim 1, wherein the controller:
in response to determining that the person equipped with the AR display device is not an authorized user of the electronic device, presents, at the AR display device, a second notification content visually tethered to the electronic device and indicating that the user lacks authentication credential to access the electronic device.

9. The electronic device of claim 1, wherein the notification content is one or more of (i) a message addressed to the authorized user, (ii) media content licensed specifically for use by the authorized user, and (iii) private information about the authorized user.

10. A method comprising:
communicatively connecting an electronic device to an augmented reality (AR) display device;
receiving an image stream from a field of view (FOV) of the AR display device;
identifying at least one object within the image stream;
generating notification content associated with a particular object of the at least one object;
queueing the notification content for presentation when the electronic device is activated by an authorized user of the electronic device;
determining whether a person equipped with the AR display device is the authorized user; and
presenting, at the AR display device, the notification content visually tethered to the particular object, in response to determining that the person equipped with the AR display device is the authorized user.

11. The method of claim 10, further comprising:
wirelessly connecting to the particular object; and
identifying the particular object at least in part by determining respective locations of the at least object and the AR display device by signal direction and range finding.

12. The method of claim 10, wherein identifying the object within the image stream further comprises receiving, from the AR display device, one or more of: (i) gaze direction of the FOV of the AR display device; (ii) absolute location of the AR display device; (iii) location of the AR display device relative to the electronic device; and (iv) identification of the particular object in the image stream.

13. The method of claim 10, further comprising:

communicatively connecting to the particular object; and activating a feature of the particular object in response to receiving a user input from the person equipped with the AR display device.

14. The method of claim 10, further comprising:

identifying the particular object as being manually configurable; and presenting the notification content that guides manual configuration of the particular object.

15. The method of claim 10, further comprising presenting the notification content associated with the particular object based on receiving a user selection of: (i) the notification content; and (ii) the particular object for presenting the notification content.

16. The method of claim 10, further comprising:

presenting the notification content comprising streaming content;

receiving updates of the FOV of the AR display device; and pausing presentation by the AR display device of the notification content visually tethered to the particular object in response to the particular object being outside of the FOV.

17. The method of claim 10, wherein:

the notification content is one or more of (i) a message addressed to the authorized user, (ii) media content licensed specifically for use by the authorized user, and (iii) private information about the authorized user; and the method further comprises presenting, at the AR display device, a second notification content visually tethered to the electronic device and indicating that the user lacks authentication credential to access the electronic device, in response to determining that the person equipped with the AR display device is not an authorized user of the electronic device.

18. A computer program product comprising:

a computer readable storage device; and program code on the computer readable storage device that when executed by a processor associated with an electronic device, the program code enables the electronic device to provide functionality of:

communicatively connecting the electronic device to an augmented reality (AR) display device;

receiving an image stream from a field of view (FOV) of the AR display device;

identifying at least one object within the image stream;

generating notification content associated with a particular object of the at least one object;

queueing the notification content for presentation when the electronic device is activated by an authorized user of the electronic device;

determining whether a person equipped with the AR display device is the authorized user; and presenting, at the AR display device, the notification content visually tethered to the particular object, in response to determining that the person equipped with the AR display device is the authorized user.

19. The computer program product of claim 18, wherein the program code enables the electronic device to provide the functionality of:

wirelessly connecting to the particular object; and identifying the particular object at least in part by determining respective locations of the at least object and the AR display device by signal direction and range finding.

20. The computer program product of claim 18, wherein the program code enables the electronic device to provide the functionality of identifying the object within the image stream by receiving, from the AR display device, one or more of: (i) gaze direction of the FOV of the AR display device; (ii) absolute location of the AR display device; (iii) location of the AR display device relative to the electronic device; and (iv) identification of the particular object in the image stream.

* * * * *